United States Patent
Prachoomdang et al.

(10) Patent No.: US 9,518,176 B2
(45) Date of Patent: Dec. 13, 2016

(54) HIGH TEMPERATURE GEOMEMBRANE LINERS AND MASTER BATCH COMPOSITIONS

(71) Applicant: GSE Environmental, LLC, Houston, TX (US)

(72) Inventors: Yongyoot Prachoomdang, Houston, TX (US); Yin Wu, Houston, TX (US)

(73) Assignee: GSE Environmental, LLC, Houston, TX (US)

( * ) Notice: Subject to any disclaimer, the term of this patent is extended or adjusted under 35 U.S.C. 154(b) by 236 days.

(21) Appl. No.: 14/271,011

(22) Filed: May 6, 2014

(65) Prior Publication Data

US 2014/0364545 A1 Dec. 11, 2014

Related U.S. Application Data

(60) Provisional application No. 61/831,526, filed on Jun. 5, 2013.

(51) Int. Cl.
| | |
|---|---|
| *C08L 23/08* | (2006.01) |
| *C08L 23/06* | (2006.01) |
| *C08J 3/22* | (2006.01) |
| *B09B 1/00* | (2006.01) |

(52) U.S. Cl.
CPC ............... *C08L 23/06* (2013.01); *B09B 1/00* (2013.01); *C08J 3/226* (2013.01); *C08J 2323/04* (2013.01); *C08J 2423/04* (2013.01); *C08L 2201/08* (2013.01); *C08L 2205/025* (2013.01); *C08L 2310/00* (2013.01)

(58) Field of Classification Search
CPC . C08L 2205/025; C08L 23/06; C08L 2201/08; C08J 3/226
See application file for complete search history.

(56) References Cited

U.S. PATENT DOCUMENTS

| | | |
|---|---|---|
| 5,221,570 A | 6/1993 | Gokcen et al. |
| 5,920,005 A | 7/1999 | Moss |
| 2004/0024095 A1 | 2/2004 | Vaillant |
| 2004/0097620 A1* | 5/2004 | Kaprinidis ............... C08K 3/26 524/99 |
| 2011/0034635 A1 | 2/2011 | Kapur et al. |
| 2011/0105675 A1* | 5/2011 | Botros ................... B32B 27/08 524/517 |
| 2012/0245260 A1 | 9/2012 | Lunghi et al. |
| 2013/0137828 A1 | 5/2013 | Michie, Jr. et al. |

OTHER PUBLICATIONS

John Scheirs A Guide to Polymeric Geomembranes 2009.*
International Search Report and Written Opinion dated Sep. 15, 2014.
Muller; "HDPE Materials and Geomembrane Manufacture" in HDPE Geomembranes in Geotechnics: Springer [978-3-540-37288-2 (Online ISBN)]; pp. 11-33 (2007).
Rowe et al.; "Aging of HDPE Geomembrane in Three Composite Landfill Liner Configurations"; J. Geotech. Geoeng. Engg. vol. 134, No. 7 pp. 906-916 (Jul. 2008) entire document.

* cited by examiner

*Primary Examiner* — Mark Kaucher
(74) *Attorney, Agent, or Firm* — Wood, Phillips, Katz, Clark & Mortimer

(57) ABSTRACT

Geomembrane liners suitable for use at elevated temperatures up to 100° C., as well as master batch compositions suitable for preparing such geomembrane liners.

11 Claims, 1 Drawing Sheet

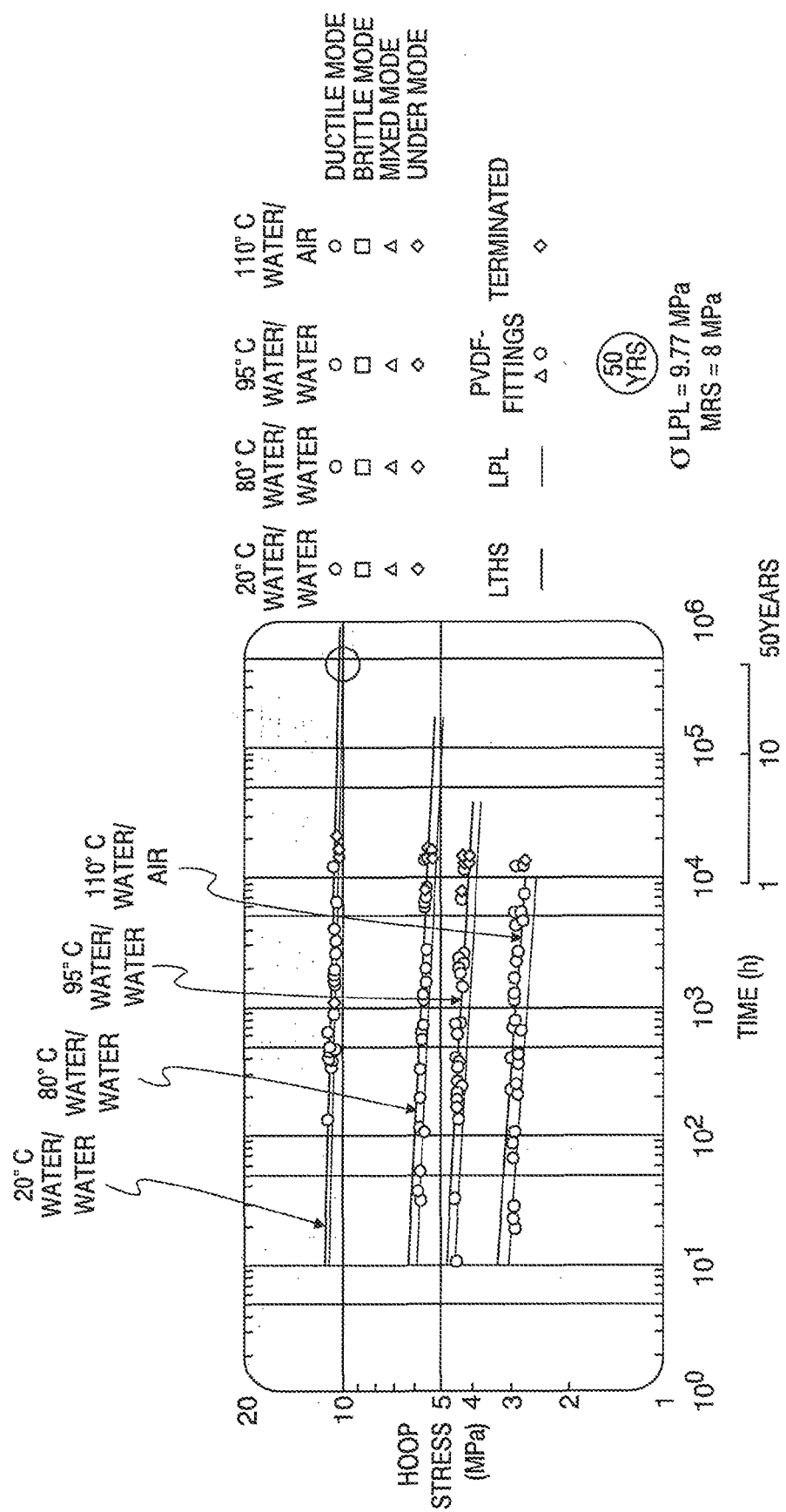

HIGH TEMPERATURE GEOMEMBRANE LINERS AND MASTER BATCH COMPOSITIONS

CROSS-REFERENCE TO RELATED APPLICATIONS

This is a non-provisional patent application claiming priority to U.S. Provisional Application Ser. No. 61/831,526, filed Jun. 5, 2013, entitled "High Temperature Geomembrane Liners and Master Batch Compositions", which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to geomembrane liners, and more specifically to geomembrane liners prepared using a special base resin and a special master batch allowing the geomembrane liners to operate at elevated temperatures up to 100° C.

BACKGROUND OF THE INVENTION

Polyethylene geomembranes have been successfully used for hazardous waste containments and water reservoirs for more than 30 years. However, because the long service life is a requirement for most applications, their usage is generally limited to those applications that operate at temperature at and below 60° C. At higher temperatures, geomembranes are subjected to an accelerated oxidative degradation and creep, thereby shortening their service lives. The mechanism of geomembranes' failure can roughly be divided into three stages.

Stage 1, "ductile failure," occurs due to stress overload and is a purely mechanical failure.

Stage 2, "brittle-mechanical failure," occurs due to creeping and depletion of additives.

Stage 3, "brittle-chemical failure," occurs due to complete consumption of additives; is purely chemical and independent of stress. Stage 3 failure is rapid.

All three stages are the deciding factors of service life of a geomembrane. Stage 1 is dependent on the number and entanglement of tie-molecules. Resins with higher number of tie-molecules and more entanglements will have a longer ductile mode. At high temperatures, molecules are very active and mobile, which in turn accelerates the creeping mechanism. In addition, the rate of depletion of additives is also increased with the increase of temperature. The combined effects of creep and additives depletion lower the lives of stages 2 and 3.

Therefore, there is a need in the art for geomembranes that can be utilized at elevated temperatures, such as those above 60° C.

SUMMARY OF THE INVENTION

In one aspect of the present invention, a composition for preparing a geomembrane liner for a containment system is provided, wherein said composition is of: 1) a master batch; and 2) a base resin and wherein said composition comprises:

1) about 8-10 wt % of a master batch composition comprising:
   a) about 70 to about 80 wt % of one or more of a Linear Low Density Polyethylene (LLDPE), Medium Density Polyethylene (MDPE), High Density Polyethylene (HDPE), or Polyethylene of Raised Temperature (PERT) resin carrier has density from 0.910 to 0.955 g/cm$^3$;
   b) about 1 to about 3 wt % of a primary antioxidant, wherein said primary antioxidant comprises 1,3,5-trimethyl-2,4,6-tris-(3,5-di-t-butyl-4-hydroxybenzyl) benzene;
   c) about 0.1 to about 0.5 wt % of a secondary antioxidant, wherein said secondary antioxidant comprises pentaerythritol tetrakis(3-(3,5-di-tert-butyl-4-hydroxyphenyl)propionate);
   d) optionally, about 0.1 to about 0.5 wt % of tris (2,4-di-tert-butylphenyl) phosphite;
   e) about 1 to about 3 wt % of a UV stabilizer, wherein said UV stabilizer comprises a high molecular weight hindered amine light stabilizer;
   f) about 0.1 to about 0.5 wt % of an acid neutralizer; and
   g) about 20 to about 30 wt % of a carbon black, wherein said carbon black is a furnace carbon black, and wherein the percentages by weight add up to 100% and are based on the total weight of the master batch composition; and
2) about 90 to about 92 wt % of a base resin composition comprising a Polyethylene of Raised Temperature (PERT) base resin, wherein the percentage by weight is based on the total weight of the geomembrane composition.

It should be understood that the master batch composition by itself is also an aspect of the invention.

In one form of this aspect of the master batch invention, resin carrier is one or more of a Linear Low Density Polyethylene (LLDPE), Medium Density Polyethylene (MDPE), High Density Polyethylene (HDPE), or Polyethylene of Raised Temperature (PERT). In another form of this aspect of the master batch invention, the high molecular weight hindered amine light stabilizer is 1,3,5-Triazine-2,4,6-triamine,N,N'''-[1,2-ethane-diyl-bis[[[4,6-bis[butyl(1,2,2,6,6-pentamethyl-4-piperidinyl)amino]-1,3,5-triazine-2-yl]imino]-3,1-propanediyl]].

In still another form of this aspect of the master batch invention, the acid neutralizer comprises hydrotalcite.

In another aspect of the present invention, a geomembrane liner is provided, wherein this geomembrane liner is prepared by letting down the inventive composition (i.e., a master batch) in a base resin.

In one form of this aspect of the invention, the geomembrane liner comprises about 1100 to about 1400 parts per million (ppm) of said primary antioxidant; about 400 to about 500 ppm of said secondary antioxidant; about 0 to about 100 ppm of tris(2,4-di-tert-butylphenyl)phosphite; about 1200 to about 1500 ppm of said UV stabilizer; about 300 to about 400 ppm of said acid neutralizer; and about 20,000 to about 25,000 ppm of said carbon black.

Other objects, features, and advantages of the invention will become apparent from a review of the entire specification, including the appended claims and drawings.

BRIEF DESCRIPTION OF THE FIGURE

FIG. 1 illustrates the results of a hoop stress test of polyethylene of raised temperature (PE-RT) per ISO9080.

DETAILED DESCRIPTION OF THE INVENTION

In one aspect, the invention provides geomembranes that are resistant to environmental stress crack, have good mechanical properties, and therefore can have long service lives at elevated temperatures of up to 100° C.

Base resin used in the inventive geomembranes is Polyethylene of Raised Temperature (PERT), which comprises disproportionately more high molecular weight particles than low molecular weight particles. Thus, it is preferred that most of the co-monomers (side branches) also have a relatively high molecular weight.

To make a geomembrane, normally a master batch is first prepared. The master batch can then be let down in the resin material to make a geomembrane. It is well within a skill of the art to prepare a final product (e.g., a geomembrane) from a master batch.

In one aspect, the inventive master batch comprises a resin carrier; a carbon black; a thermal stabilizer which comprises a primary antioxidant, a secondary thermal stabilizer; and optionally, a tertiary antioxidant; a UV stabilizer; and an acid neutralizer.

Preferably, resin carriers used in the inventive geomembranes comprise either Linear Low Density Polyethylene (LLDPE), Medium Density Polyethylene (MDPE), or High Density Polyethylene (HDPE).

Even more preferably, the resin carriers comprise Polyethylene of Raised Temperature (PERT).

Some non-limiting trade name examples of preferred PERT resins for the purposes of this invention include Dowlex® 2344, Dowlex® 2377, Dowlex® 2388, DGDA-2399, Intrepid™ 2498 NT, Intrepid™ 2499 NT (all products of Dow Chemical, US), Yuclair® DX800 (SK Global Chemical, South Korea), Daelim XP9000 (Daelim, South Korea), Total XRT70 (Total, France), Hostalen 4731B (LyondellBasell, the Netherlands), and Eltex® TUB220-RT (Ineos, Switzerland).

Certain non-PERT resins also can be used as carriers. However, High Temperature Liner incorporated non-PERT Master batch has an application limit of 90° C. Some non-limiting trade name of preferred non-PERT resins for the purposes of this master batch invention include SABIC® LLDPE 0132HS00 (Saudi Basic Industries Corporation, Saudi Arabia), Marlex® K203 (Chevron Phillips Chemical Company, US), and Dowlex® 2342M (Dow Chemical, US).

Resin carriers used for this master batch invention should have density from 0.910 to 0.955 g/cm$^3$; and Melt Index (MI) (2.16 kg) of less than or equal to 1 dg/min.

The thermal stabilizer used in the inventive compositions comprises a primary antioxidant, a secondary thermal stabilizer; and optionally, a tertiary antioxidant.

The primary antioxidant is used for long term stabilization and comprises 1,3, trimethyl-2,4,6-tris-(3,5-di-t-butyl-4-hydroxybenzyl) benzene, CAS No. 1709-70-2. Some non-limiting trade name examples of the primary antioxidant include Irganox 1330 (BASF, Germany), Ethanox 330 (Albemarle Corporation, US), BNX 1330 (Mayzo, US), Songnox 1330 (Songwon, South Korea), and others.

The secondary antioxidant used in the inventive compositions is a hindered pheonolic antioxidant called pentaerythritol tetrakis(3-(3,5-di-tert-butyl-4-hydroxyphenyl)propionate, CAS No. 6683-19-8. Some non-limiting trade name examples of the secondary antioxidant include Irganox 1010 (BASF, Germany), BNX 1010 (Mayzo, US), Songnox 1010 (Songwon, South Korea), and others.

The tertiary antioxidant that can optionally be used in the inventive compositions is an organophosphite. In one aspect, this organophosphite is tris(2,4-di-tert-butylphenyl)phosphite, CAS No. 31570-04-4. Some non-limiting trade name examples of the tertiary antioxidant include Irgafos 168 (BASF, Germany), Benefos® 1680 (Mayzo, US), Songnox 1680 (Songwon, South Korea), and others.

The UV stabilizer used in the inventive compositions comprises a high molecular weight hindered amine light stabilizer (HALS). In one aspect, this HALS is 1,3,5-Triazine-2,4,6-triamine, N,N'''-[1,2-ethane-diyl-bis[[[4,6-bis[butyl(1,2,2,6,6-pentamethyl-4-piperidinyl)amino]-1,3, 5-triazine-2-yl]imino]-3,1-propanediyl]]. Some non-limiting trade name examples of the UV stabilizer include Chimassorb 119 (BASF, Germany), Sabo® Stab UV 119 (Sabo S.p.A, Italy), Lowilite® 19 (Chemtura, US), and others.

The acid neutralizer used in the inventive compositions comprises hydrotalcite, CAS No. 11097-59-9. Some non-limiting trade name examples of the acid neutralizer include DHT-4A (Kisuma Chemicals, the Netherlands), DHT-4V (Kisuma Chemicals, the Netherlands), Hycite® 713 (Telko, Finland), and others.

The carbon black used in the inventive compositions has a particle size smaller than or equal to a particle size of N660 carbon black. Some non-limiting trade name examples of the carbon black include Arosperse 5 (Orion Engineered Carbons, US), Raven® 880 Ultra (Columbian Chemicals, US), Black Pearls® 4060 (Cabot Corporation, US), and others.

In one aspect of the present invention, a composition for preparing a geomembrane liner for a containment system is provided, wherein said composition is of: 1) a master batch; and 2) a base resin and wherein said composition comprises:
1) about 8-10 wt % of a master batch composition comprising:
   a) about 70 to about 80 wt % of one or more of a Linear Low Density Polyethylene (LLDPE), Medium Density Polyethylene (MDPE), High Density Polyethylene (HDPE), or Polyethylene of Raised Temperature (PERT) resin carrier has density from 0.910 to 0.955 g/cm$^3$;
   b) about 1 to about 3 wt % of a primary antioxidant, wherein said primary antioxidant comprises 1,3,5-trimethyl-2,4,6-tris-(3,5-di-t-butyl-4-hydroxybenzyl) benzene;
   c) about 0.1 to about 0.5 wt % of a secondary antioxidant, wherein said secondary antioxidant comprises pentaerythritol tetrakis(3-(3,5-di-tert-butyl-4-hydroxyphenyl)propionate);
   d) optionally, about 0.1 to about 0.5 wt % of tris (2,4-di-tert-butylphenyl) phosphite;
   e) about 1 to about 3 wt % of a UV stabilizer, wherein said UV stabilizer comprises a high molecular weight hindered amine light stabilizer;
   f) about 0.1 to about 0.5 wt % of an acid neutralizer; and
   g) about 20 to about 30 wt % of a carbon black, wherein said carbon black is a furnace carbon black, and wherein the percentages by weight add up to 100% and are based on the total weight of the master batch composition; and
2) about 90 to about 92 wt % of a base resin composition comprising a Polyethylene of Raised Temperature (PERT) base resin, wherein the percentage by weight is based on the total weight of the geomembrane composition.

It should be understood that the master batch composition by itself is also an aspect of the invention.

In one form of this aspect of the master batch invention, resin carrier is a Linear Low Density Polyethylene (LLDPE), Medium Density Polyethylene (MDPE), High Density Polyethylene (HDPE), or Polyethylene of Raised Temperature (PERT). In still another form of this aspect of the master batch invention, the acid neutralizer comprises hydrotalcite.

In another aspect of the present invention, a geomembrane liner is provided, wherein this geomembrane liner is prepared by letting down the inventive composition (i.e., a master batch) in a base resin.

In one form of this aspect of the invention, the geomembrane liner comprises about 1100 to about 1400 ppm of said primary antioxidant; about 400 to about 500 ppm of said secondary antioxidant; about 0 to about 100 ppm of tris(2, 4-di-tert-butylphenyl)phosphite; about 1200 to about 1500 ppm of said UV stabilizer; about 300 to about 400 ppm of said acid neutralizer; and about 20,000 to about 25,000 ppm of said carbon black.

The total amount of the primary antioxidant, the secondary antioxidant, tris(2,4-di-tert-butylphenyl)phosphite, the UV stabilizer, and the acid neutralizer is preferably between about 3000 and 3800 ppm.

Geomembranes of the invention can be used for various purposes known to those skilled in the art. Such purposes include, but are not limited to, lining landfills, hot water containments, underground thermal energy storage, heap leach pad mines, industrial fluid discharges, and the like. This preceding list of possible uses is not limiting and is not intended to limit the applicability of the provided compositions in any way.

The following Examples are provided solely for illustrative purposes and are not meant to limit the invention in any way.

EXAMPLES OF THE INVENTION

Example 1

Inventive Master Batch and Geomembrane Composition

Table 1 lists the ingredients of one of the inventive compositions (an example of a master batch).

TABLE 1

| Masterbatch Formula | % |
|---|---|
| Dowlex ®2344 Carrier | 71.45 |
| Carbon Black N330 | 25.00 |
| Irganox 1330 | 1.40 |
| Chimassorb 119 | 1.50 |
| Irganox B225 (1:1 Blend of Irganox 1010 and Irgafos 168) | 0.25 |
| Hydrotalcite DHT 4A | 0.40 |
| Total | 100 |

Table 2 lists the ingredients of one of the inventive compositions (an example of a geomembrane).

TABLE 2

| Geomembrane Formula | % |
|---|---|
| Polyethylene of Raised Temperature (PERT) Base Resin | 91.5 |
| Inventive Master Batch | 8.5 |
| Total | 100 |

Example 2

Oven Aging Testing

The purpose of this experiment was to determine how the inventive compositions handle heat and to determine their durability.

Experimental Conditions

First, two inventive geomembranes were prepared: 1) one was prepared from the same master batch composition of Table 1 and 2) the other one was prepared from the geomembrane composition of Table 2 but a different base resin. These two inventive geomembranes are named after their base resin as Dowlex® 2344 Raised Temperature Geomembrane (GMRT 1) and Dowlex® 2377 Raised Temperature Geomembrane (GMRT 2).

Second, two comparative geomembranes were made from the same PERT base resins, but from the Standard Supplier Masterbatch (SSMB) (conventional master batch) used for preparation of conventional geomembranes.

Then, the inventive and comparative geomembrane samples were tested for Oxidative Induction Time (OIT) and High Pressure OIT (HPOIT). The OIT was tested in accordance with ASTM D3895, while the HPOIT was performed according to ASTM D5885.

Two comparative geomembranes were incubated in an air-circulating oven at 85° C. for 90 days as per ASTM D5721. GSE High Temperature geomembranes were incubated under the same environment conditions for 1 year. OIT/HPOIT tests were performed after oven aging. Percentage retained of OIT and HPOIT showed that the inventive geomembranes have an acceptable retention after 1 year incubation, while comparative geomembranes failed within 90 days of incubation.

Test results are shown in Table 3 to Table 6.

TABLE 3

GMRT 1/85° C. Oven Aging

| Test Conditions | Baseline | After 90 days | % Retained | After 375 days | % Retained |
|---|---|---|---|---|---|
| Dowlex ®2344 Raised Temperature Geomembrane (GMRT 1) | | | | | |
| 150° C., 500 psi Oxygen pressure (OIT-minute) | 987 | 813 | 82% | 901 | 92% |
| 200° C., Atmospheric Oxygen pressure (OIT-minute) | 201 | 184 | 91% | 90 | 45% |

TABLE 4

GMRT 2/85° Oven Aging

| Test Conditions | Baseline | After 90 days | % Retained | After 375 days | % Retained |
|---|---|---|---|---|---|
| Dowlex ®2377 Raised Temperature Geomembrane (GMRT 2) | | | | | |
| 150° C., 500 psi Oxygen pressure (OIT-minute) | 846 | 755 | 89% | 811 | 95% |
| 200° C., Atmospheric Oxygen pressure (OIT-minute) | 187 | 187 | 100% | 93 | 50% |

TABLE 5

Dowlex ®2344 Conventional Formulation/85° C. Oven Aging

| Test Conditions | Baseline | After 60 days | % Retained |
|---|---|---|---|
| Dowlex ®2344 Based Comparative Geomembrane | | | |
| 150° C., 500 psi Oxygen pressure (HP OIT-minute) | 315 | 216 | 69% |
| 200° C., Atmospheric Oxygen pressure (OIT-minute) | 116 | 82 | 71% |

TABLE 6

Dowlex ®2377 Conventional Formulation/85° C. Oven Aging

| Test Conditions | Baseline | After 60 days | % Retained |
|---|---|---|---|
| Dowlex ®2377 Based Comparative Geomembrane | | | |
| 200° C., Atmospheric Oxygen pressure (OIT-minute) | 120 | 88 | 73% |

Industry standard specifications for performance of geomembrane in oven aging test are listed in GRI GM13. The durability requirements of this standard require 80% retention rate of HP OIT and 55% retention rate of OIT after 90 days oven exposure. These results show that the inventive compositions GMRT1 and GMRT2, handle heat well and were durable, while the comparative compositions failed HP OIT within 90 days of incubation, and cannot compete with inventive compositions in OIT retention.

Example 3

UV Resistance Testing

The purpose of this experiment was to determine the resistance of the inventive compositions to UV.

Experimental Conditions

The inventive and comparative geomembrane samples described in Example 2 were subjected to UV Exposure in QUV with the cycle of 75° C. for 20 UV hours, 60° C. for 4 Condensation hours, and with the irradiance of 0.72 W/m$^2$·nm (±10%) at 340 nm. The UV irradiance from 295 nanometer to 400 nanometer is 39 W/m$^2$ (±10%). Exposed samples were then tested for the OIT Retained. Retention of 50% after 5,000 hours of UV Exposure is considered acceptable. Test results are shown in Table 7 and Table 8.

TABLE 7

GMRT 1, UV Exposure

| Test Conditions | Baseline | After 1220 hours UV Exposure | After 6360 hours UV Exposure |
|---|---|---|---|
| Dowlex ®2344 Raised Temperature Geomembrane (GMRT 1) | | | |
| 150° C., 500 psi Oxygen pressure (OIT-minute) | 987 | 866 (87% retained) | 693 (70% retained) |

TABLE 8

GMRT 2, UV Exposure
Dowlex ®2377 Raised Temperature Geomembrane (GMRT 2)

| Test Conditions | Baseline | After 1642 hours UV Exposure | After 6382 hours UV Exposure |
|---|---|---|---|
| 150° C., 500 psi Oxygen pressure (OIT-minute) | 846 | 783 (92% retained) | 694 (82% retained) |

Industry standard specifications for performance of geomembrane in UV aging test are listed in GRI GM13. The durability requirements of this standard require 50% retention rate of HP OIT after 1600 UV exposure. These results show that the inventive compositions are resistant to UV exposure.

Example 4

Mechanical Performance/Creep Resistance

The purpose of this experiment was to determine mechanical performance/creep resistance of the inventive compositions.

Experimental Conditions

GMRT 1 and GMRT 2 samples were tested for the Environmental Stress Crack Resistance by Single Point Notched Constant Tensile Load (SP-NCTL) Method according to ASTM D5397 (modified) at 3.4 MPa (500 psi) Tensile Stress in 80° C. solution of 10 w % Igepal CA-720 and water. The time to failure of 500 hours or greater is acceptable. Test results are shown in Table 9.

TABLE 9

GMRT 1 and GMRT 2 in 0 w % Igepal CA-720 Water Solution

| Geomembrane Sample | Temperature ° C. | Tensile Stress MPa (psi) | Failure Time hour |
|---|---|---|---|
| Dowlex ®2344 Raised Temperature Geomembrane (GMRT 1) | 80 | 3.4 (500) | ≥500 |
| Dowlex ®2377 Raised Temperature Geomembrane (GMRT 2) | 80 | 3.4 (500) | ≥500 |

Industry standard specifications for performance of geomembrane in oven aging test are listed in GRI GM13. The creep resistance requirements of this standard require at least 300 hours of testing @ 50° C. These results show that the inventive compositions have strong creep resistance.

Example 5

Mechanical Performance/Solid State Integrity

The purpose of this experiment was to determine mechanical performance/solid state integrity of the inventive compositions.

Experimental Conditions

GMRT 1 and GMRT 2 samples were tested for tensile properties according to ISO 527-1, 2. Young's Modulus of 35 MPa, Tensile Yield Stress of 4 MPa, and Break Tensile Elongation of 400% are arbitrarily chosen as minimum values to assure integrity of solid state property of Geomembrane at an elevated temperature. Results are shown in Table 10 and Table 11.

TABLE 10

Tensile Properties, GMRT 1

| Test Temperature (° C.) | Young' Modulus MPa (ksi) | Yield Stress MPa (psi) | Break Elongation (%) |
|---|---|---|---|
| 60 | 130 (19) | 11 (1600) | ≥400 |
| 80 | 75 (10) | 7 (1000) | ≥400 |
| 100 | 38 (5.5) | 5 (700) | ≥400 |

TABLE 11

Tensile Properties, GMRT 2

| Test Temperature (° C.) | Young' Modulus MPa (ksi) | Yield Stress MPa (psi) | Break Elongation (%) |
|---|---|---|---|
| 60 | 175 (25) | 13 (1900) | ≥400 |
| 80 | 90 (13) | 9 (1300) | ≥400 |
| 100 | 50 (7.2) | 6 (850) | ≥400 |

These results show that the inventive compositions have good solid state properties.

Additionally, various test results of PE-RT resin and on the inventive geomembrane compositions further illustrate the suitability of the geomembrane compositions according to present invention.

PE-RT (Polyethylene of Raised Temperature) resin used as the base resin for the high temperature liner has a history of successful field service for high temperature pressure pipes applications. FIG. 1 illustrates the results of a USO9080 hoop stress test of PE-RT. Such hoop stress test is a typical test method to evaluate the creep resistance of pressure pipes, and gives an extrapolating method of linear regression analysis to estimate the lifespan of a resin in pipe form. In FIG. 1, the PE-RT was tested for hoop stress test at four temperatures: 20, 80, 95, and 110° C. At 110° C. testing temperature, no creep failure was observed after 10,000 hours (over 1 year) testing. Through the extrapolating method, the resin is determined to have over 25 years creep resistance at 80° C.

Additionally, aging tests have also shown excellent aging properties, with excellent antioxidants retention at elevated temperatures and superb UV protection, as shown in Table 12.

TABLE 12

High Temperature Liner Aging Test Results vs. Industry Regulation

| Property | GRI GM13 | GSE High temperature Liner |
|---|---|---|
| [1]High Pressure Oxidant Induction Time (HPOIT) Oven Aging | 400 min | ≥700 min |
| [1,2]HPOIT Retained after 90 Days 85° C. Exposure | 80% | ≥85% |
| [1,2]HPOIT Retained after 90 Days 100° C. Exposure | — | ≥80% |
| [1,2]HPOIT Retained after 1 year 85° C. Exposure UV Aging | — | ≥80% |
| [1,3]HPOIT Retained after 1600 hrs QUV Exposure | 50% | ≥70% |
| [1,3]HPOIT Retained after 6000 hrs QUV Exposure | — | ≥60% |

[1]High Pressure OIT Test Procedure per ASTM D5885
[2]Oven Aging Procedure per ASTM D5721
[3]UV Exposure Procedure per ASTM D7238

UV exposure conditions:

Per GRI GM13, ASTM D7238

Exposure cycle: 201 UV cycle at 75° C. followed by 4 h condensation at 60° C.

UV lamp: UVA-340

Irradiance level: 0.72 W/(m$^2$·nm) at 340 nm

Tensile properties of the high temperature liners are shown in Table 13 and 14. Table 13 compares the tensile properties at room temperature of the high temperature liners (60 mil) versus industry regulation (GRI GM13) per ASTM D6693, and Table 14 (discussed below) shows the advantageous tensile properties at high temperatures of the inventive high temperature liners (60 mil) per ISO 527.

TABLE 13

High Temperature Liner Tensile Properties vs. Industry Regulation

| Tensile Properties @ Room Temperature 23° C. | GRI GM13 | GSE High Temperature Liner |
|---|---|---|
| Yield Strength (psi) | 126 | 140 |
| Yield Elongation (%) | 12 | 15 |
| Break Strength (psi) | 228 | 300 |
| Break Elongation (%) | 700 | 700 |

A higher start up value of yield/break strength at room temperature usually brings a higher strength level at elevated temperatures.)

Still further, a geomembrane meeting the following criteria will function well as a solid barrier by assuring the integrity of its solid state property at an elevated temperature:

I. Yield Stress ≥4 Mpa (580 psi);

II. Elastic Modulus ≥35 Mpa (5000 psi);

III. Break Tensile Elongation ≥400%

As shown in Table 14, the high temperature liner far exceeds such desirable tensile strengths. Elastic modulus, also known as tensile modulus, is a measure of the stiffness of materials. Coupled with yield stress and break tensile elongation, it tells the mechanical integrity of the geomembrane at the test temperature. For example, Elastic Modulus of the high temperature Liner at 100° C. is higher than 38 MPa (5,500 psi). This value is comparable to those of VLDPE and TPO roofing membranes at room temperature.

TABLE 14

High Temperature Liner Tensile Properties at elevated temperature

| Test Temperature ° C. | Yield Strength Mpa (psi) | Break Elongation % | Elastic Modulus Mpa (psi) |
|---|---|---|---|
| 40 | ≥16 (2320) | ≥400* | ≥270 (39,000) |
| 60 | ≥11 (1600) | ≥400* | ≥130 (19,000) |
| 80 | ≥7 (1000) | ≥400* | ≥75 (10,000) |
| 100 | ≥5 (700) | ≥400* | ≥38 (5,500) |

*Due to the configuration of the test frame and temperature chamber, the maximum strain that could be measured was limited @ 400%.

Environmental stress crack resistance is also illustrated by the Notched Constant Tensile Load (NCTL) Test per ASTM D5397. As shown in Table 15, whereas standard NCTL testing temperature is 50° C., even at an elevated test temperature of 80° C., no failure was observed after 1000 testing hours.

TABLE 15

Notched Constant Temperature Load Test of High
Temperature Liner at elevated temperatures

| Property | GRI GM13 | GSE High Temperature Liner |
|---|---|---|
| NCTL @ 50° C. | 300 hrs | ≥2000 hrs |
| NCTL @ 80° C. | — | ≥1000 hrs |

Still other aspects, objects, and advantages of the present invention can be obtained from a study of the specification and the appended claims. It should be understood, however, that the present invention could be used in alternate forms where less than all of the objects and advantages of the present invention and preferred embodiment as described above would be obtained.

The invention claimed is:

1. A composition for preparing a geomembrane liner for a containment system, wherein said composition is of: 1) a master batch; and 2) a base resin and wherein said composition comprises:
   i) about 8-10 wt % of a master batch composition comprising
      a) about 70 to about 80 wt % of a Linear Low Density Polyethylene (LLDPE), Medium Density Polyethylene (MDPE), High Density Polyethylene (HDPE), or Polyethylene of Raised Temperature (PERT) resin carrier has density from 0.910 to 0.955 g/cm$^3$;
      b) about 1 to about 3 wt % of a primary antioxidant, wherein said primary antioxidant comprises 1,3,5-trimethyl-2,4,6-tris-(3,5-di-t-butyl-4-hydroxybenzyl) benzene;
      c) about 0.1 to about 0.5 wt % of a secondary antioxidant, wherein said secondary antioxidant comprises pentaerythritol tetrakis(3-(3,5-di-tert-butyl-4-hydroxyphenyl)propionate);
      d) optionally, about 0.1 to about 0.5 wt % of tris (2,4-di-tert-butylphenyl) phosphite;
      e) about 1 to about 3 wt % of a UV stabilizer, wherein said UV stabilizer comprises a hindered amine light stabilizer;
      f) about 0.1 to about 0.5 wt % of an acid neutralizer; and
      g) about 20 to about 30 wt % of a carbon black, wherein said carbon black is a furnace carbon black, and wherein the percentages by weight add up to 100% and are based on the total weight of the master batch composition; and
   ii) about 90 to about 92 wt % of a base resin composition comprising Polyethylene of Raised Temperature (PERT) base resin, wherein the percentage by weight is based on the total weight of the geomembrane composition.

2. The composition of master batch in claim 1, wherein said resin carrier is polyethylene of raised temperature (PERT).

3. The composition of claim 1, wherein said hindered amine light stabilizer is 1,3,5-Triazine-2,4,6-triamine,N,N'''-[1,2-ethane-diyl-bis[[[4,6-bis[butyl(1,2,2,6,6-pentamethyl-4-piperidinyl)amino]-1,3,5-triazine-2-yl]imino]-3,1-propanediyl]].

4. The composition of claim 1, wherein said acid neutralizer is hydrotalcite.

5. A geomembrane liner prepared from the composition of claim 1, wherein said geomembrane liner has an oven aging performance for 1 year incubation @ 85° C. per ASTM D5721 such that 90% of high pressure OIT value retained per ASTM D5885.

6. A geomembrane liner prepared from the composition of claim 1, wherein said geomembrane liner has an UV aging performance for 1 year UV exposure such that 70% of high pressure OIT value retained according to ASTM D5885.

7. A geomembrane liner prepared from the composition of claim 1, wherein said geomembrane liner has a creep resistance according to modified ASTM D 5397 such that no failure occurred within 500 hours testing at 80° C.

8. A geomembrane liner prepared from the composition of claim 1, wherein said geomembrane liner has an adequate solid state property at 100° C. such that a Young's Modulus of at least 38 Mpa according to ISO 527-1,2.

9. A master batch composition comprising
   a) about 70 to about 80 wt % of a Linear Low Density Polyethylene (LLDPE), Medium Density Polyethylene (MDPE), High Density Polyethylene (HDPE), or Polyethylene of Raised Temperature (PERT) resin carrier has density from 0.910 to 0.955 g/cm$^3$;
   b) about 1 to about 3 wt % of a primary antioxidant, wherein said primary antioxidant comprises 1,3,5-trimethyl-2,4,6-tris-(3,5-di-t-butyl-4-hydroxybenzyl) benzene;
   c) about 0.1 to about 0.5 wt % of a secondary antioxidant, wherein said secondary antioxidant comprises pentaerythritol tetrakis(3-(3,5-di-tert-butyl-4-hydroxyphenyl)propionate);
   d) optionally, about 0.1 to about 0.5 wt % of tris (2,4-di-tert-butylphenyl) phosphite;
   e) about 1 to about 3 wt % of a UV stabilizer, wherein said UV stabilizer comprises a hindered amine light stabilizer;
   f) about 0.1 to about 0.5 wt % of an acid neutralizer; and
   g) about 20 to about 30 wt % of a carbon black, wherein said carbon black is a furnace carbon black, and wherein the percentages by weight add up to 100% and are based on the total weight of the master batch composition.

10. A geomembrane liner prepared by letting down the master batch composition of claim 9 in a base resin (PERT).

11. The geomembrane liner of claim 10, wherein said geomembrane liner comprises about 1100 to about 1400 ppm of said primary antioxidant; about 400 to about 500 ppm of said secondary antioxidant; about 0 to about 100 ppm of tris (2,4-di-tert-butylphenyl) phosphite; about 1200 to about 1500 ppm of said UV stabilizer; about 300 to about 400 ppm of said acid neutralizer; and about 20,000 to about 25,000 ppm of said carbon black.

* * * * *